US012279357B1

(12) United States Patent
Lee et al.

(10) Patent No.: US 12,279,357 B1
(45) Date of Patent: Apr. 15, 2025

(54) ELECTRON RESONANCE SOURCE APPARATUS AND METHOD OF USE THEREOF

(71) Applicants: W. Davis Lee, Rockport, ME (US); Mark Amato, S. Hamilton, MA (US); Benjamin N. Wright, Haverhill, MA (US); Gabriel Maxwell, Allston, MA (US)

(72) Inventors: W. Davis Lee, Rockport, ME (US); Mark Amato, S. Hamilton, MA (US); Benjamin N. Wright, Haverhill, MA (US); Gabriel Maxwell, Allston, MA (US)

( * ) Notice: Subject to any disclaimer, the term of this patent is extended or adjusted under 35 U.S.C. 154(b) by 5 days.

(21) Appl. No.: 18/386,773

(22) Filed: Nov. 3, 2023

(51) Int. Cl.
*H05H 1/46* (2006.01)
*H05H 1/18* (2006.01)

(52) U.S. Cl.
CPC ............ *H05H 1/4637* (2021.05); *H05H 1/18* (2013.01)

(58) Field of Classification Search
None
See application file for complete search history.

(56) References Cited

U.S. PATENT DOCUMENTS 5,370,765 A * 12/1994 Dandl ............... H01J 37/32678 427/571
2011/0262313 A1* 10/2011 Hitz ........................ C01B 3/506 422/186.01
2011/0262314 A1* 10/2011 Hitz .................... C01B 13/0207 422/186.01
2015/0173167 A1* 6/2015 Lacoste ................. C23C 14/357 315/111.61

* cited by examiner

*Primary Examiner* — Wilson Lee
(74) *Attorney, Agent, or Firm* — Kevin H. Hazen; Hazen Patent Group, LLC

(57) ABSTRACT

The invention comprises a method and apparatus for generating a plasma, comprising:

(1) receiving a microwave from a co-axial cable, with a first impedance, into an electron cyclotron resonance source, the electron cyclotron resonance source comprising: a housing containing a first transform material and a transmission section; (2) passing the microwave through the first transform material with a second impedance; (3) coupling the microwave into the transmission section of the electron cyclotron resonance source, the transmission section comprising a third impedance, the transmission section comprising a first dielectric gap positioned between an inner conductor and an outer conductor; (4) generating a magnetic field with a set of magnets; and (5) accelerating cyclotron resonant electrons circulating about the magnet field with the microwave, such as where the first transform material has a thickness of one-quarter of a wavelength of the microwave.

20 Claims, 9 Drawing Sheets

ELECTRON RESONANCE SOURCE APPARATUS AND METHOD OF USE THEREOF

BACKGROUND OF THE INVENTION

Field of the Invention

The invention relates generally to an electron resonance source.

Discussion of the Prior Art

Problem

There exists in the art a need for readily, efficiently, and locally generating an electron resonance in plasma.

SUMMARY OF THE INVENTION

The invention comprises an electron resonance source apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for generating a plasma, comprising: (1) receiving a microwave from a co-axial cable, with a first impedance, into an electron cyclotron resonance source, the electron cyclotron resonance source comprising: a housing containing a first transform material and a transmission section; (2) passing the microwave through the first transform material with a second impedance; (3) coupling the microwave into the transmission section of the electron cyclotron resonance source, the transmission section comprising a third impedance, the transmission section comprising a first dielectric gap positioned between an inner conductor and an outer conductor; (4) generating a magnetic field with a set of magnets; and (5) accelerating cyclotron resonant electrons circulating about the magnet field with the microwave, such as where the first transform material has a thickness of one-quarter of a wavelength of the microwave.

Herein, a z-axis is along a length of an electron cyclotron source and/or a direction of travel of an electromagnetic wave and an x/y-plane is perpendicular to the z-axis, such as along an emission surface of a source.

Electron Resonance Source

Electron cyclotron resonance (ECR) is a phenomenon observed in plasma physics, condensed matter physics, and accelerator physics occurring when a frequency of incident radiation coincides with the natural frequency of rotation of electrons in a magnetic field.

Herein, an impedance transformer and an applied magnetic field in an electron cyclotron resonance source or ECR source operates on an electromagnetic wave, such as a microwave carried in a co-axial cable, to generate a magnetic field condition suitable for electron cyclotron resonance, such as in a gas or plasma.

Figure 1:
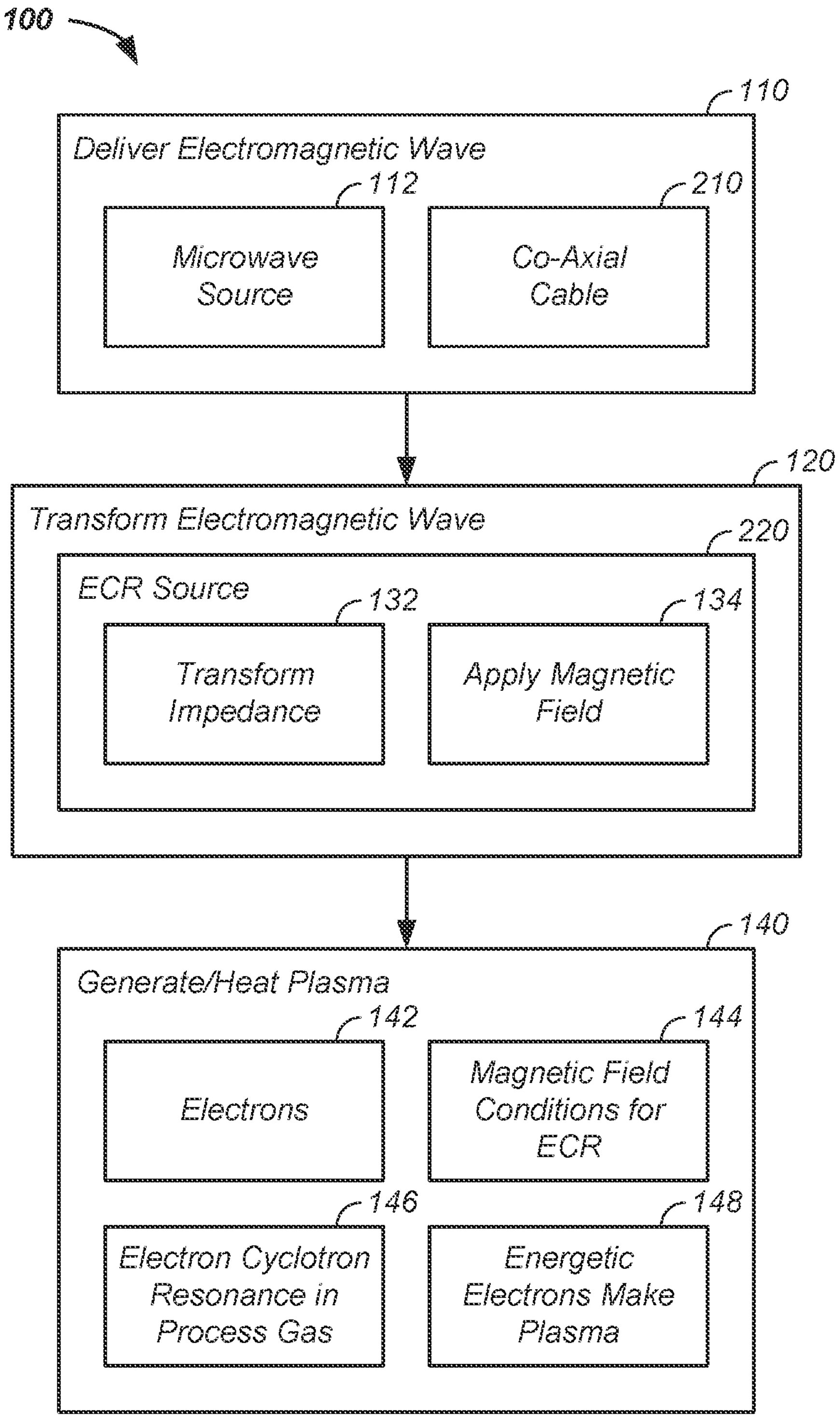
FIG. 1 illustrates a method of use of a plasma generation device.

Referring now to FIG. 1 a method of generating and/or heating a plasma 100 is illustrated. In a first step, an electromagnetic wave is delivered 110, such as a microwave from a microwave source 112 carried in a co-axial cable 210. The electromagnetic wave is optionally and preferably in a range of 900 MHz to 15 GHz, such as at 2.45 GHz±0.1 GHZ. In a second step, the electromagnetic wave, optionally and preferably delivered from the co-axial cable 210, is transformed 120 in a plasma generation system 200/an electron cyclotron resonance source 220. Generally, an electron cyclotron resonance source 220 transforms impedance 132 and applies a magnetic field 134. In an optional third step, heat is generated, a gas is heated, and/or a plasma is heated 140. For instance, electrons 143 interact with a magnetic field condition suitable for electron cyclotron resonance 144, such as in a process gas 146 to form energetic electrons that heats the gas into a plasma 148 and/or heats the plasma.

Figure 2:
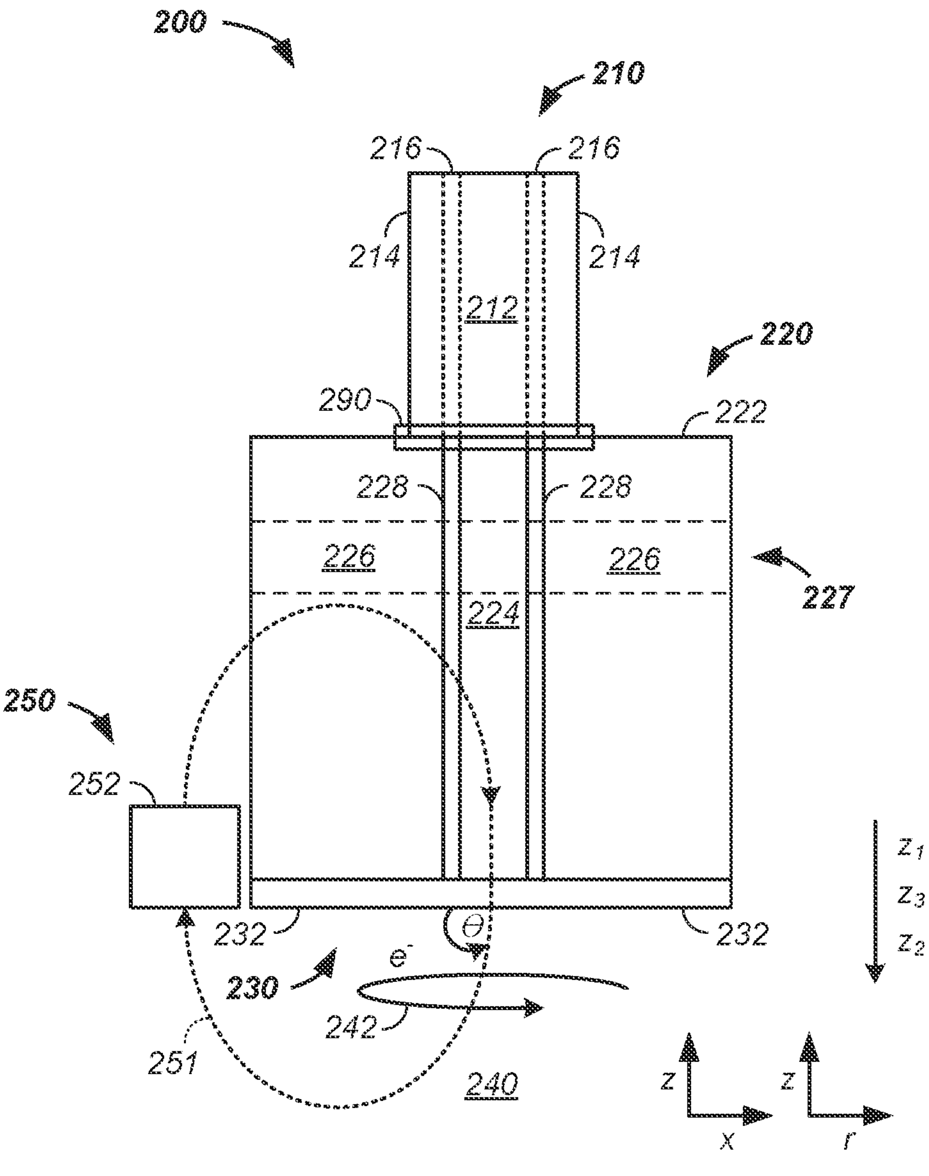
FIG. 2 illustrates an electron cyclotron resonance source.

Referring now to FIG. 2, a plasma generation system 200 is illustrated. Generally, the plasma generation system 200, in a housing 222, operates on an electromagnetic wave that is optionally delivered via a co-axial cable 210. The co-axial cable 210 includes a co-axial cable inner conductor 212, a co-axial cable outer conductor 214, and a co-axial cable dielectric material 216 therebetween, such as a tube of dielectric material, which guides the electromagnetic wave. For clarity of presentation and without loss of generality, the co-axial cable 210 delivers the electromagnetic wave/source energy, such as a microwave, to the electron resonance source 220.

Referring again to FIG. 2, the electron cyclotron resonance source 220 of the plasma generation system 200 is further described. Generally, a co-axial cable connector 290 connects: an ECR inner conductor 224 with the co-axial cable inner conductor 212; an ECR outer conductor 226 with the co-axial cable outer conductor 214; and an ECR dielectric material 228 and/or ECR dielectric gap with the co-axial cable dielectric material 216, where the ECR dielectric material 228 is optionally a gas, such as air. Herein, a cross-sectional volume of the ECR outer conductor 226, the ECR dielectric material, and the ECR inner conductor is optionally referred to as a transmittance section 227. Several examples of the electron resonance source 220 are provided infra to illustrated coupling of the electromagnetic radiation from the co-axial cable 210 to the gas/plasma zone.

Example I

In a first example, the electromagnetic wave passes sequentially through the electron cyclotron resonance source 220 with a first impedance, $z_1$; through a transformer material 230 having a third impedance, $z_3$; and into a chamber or zone containing a gas and/or a plasma 240, the volume of the chamber and its contents having a second impedance $z_2$. As illustrated, the transformer material 230 having a third impedance includes one or more sections, such as a first transform/transformer section/material 232, through which the electromagnetic wave or microwave passes.

Figure 5A:
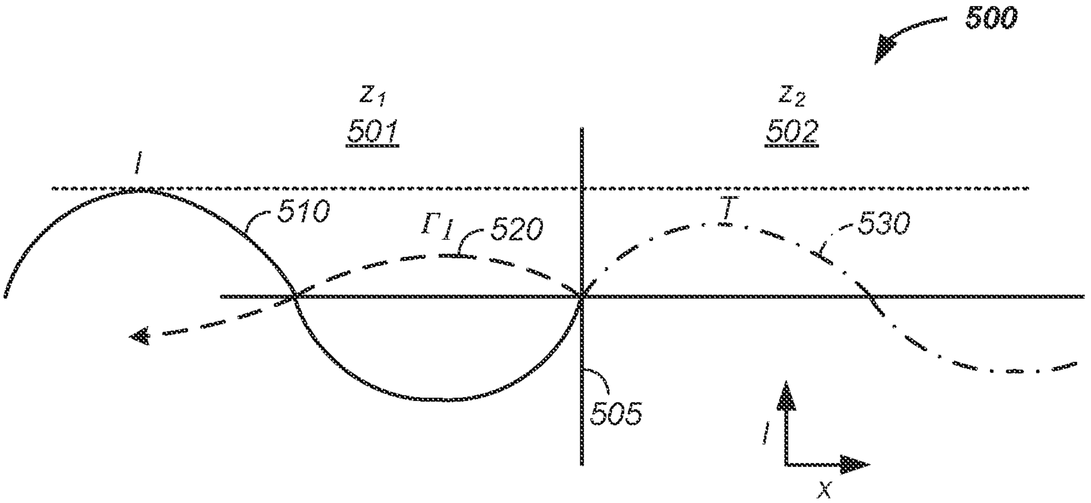
FIG. 5A illustrates reflectance off of a barrier and FIG. 5B illustrates deconstructive reflectances off of a quarter-wavelength transformer.

Referring now to FIG. 5A, generally, when an incident electromagnetic wave, I, passes from a zone with a first impedance, $z_1$, to a zone with a second impedance, $z_2$, via a material with a third impedance, $z_3$, there is a first reflectance, $\Gamma'_1$, 520 off of the material 505 and the resulting transmittance, T, 530 has an intensity that is less than an initial intensity of the incident electromagnetic wave, I, by a magnitude of the first reflectance, $\Gamma'_1$, 520 according to equation 1.

$$\Gamma'_1=(z_2-z_1)/(z_2+z_1) \quad \text{(eq. 1)}$$

Referring again to FIG. 2, radiofrequency power from the microwave source 112 is thus coupled into the gas/plasma 240, such as via absorbance. The electron cyclotron resonance source 220 additionally includes at least one magnet of a set of magnets 250, such as a permanent magnet and/or an electromagnet. As illustrated, a first magnet 252 provides a magnetic field 251 that extends into the gas/plasma 240, optionally and preferably at an angle, Θ, with 1, 2, 5, 10, 25, or 45 degrees of perpendicular to an exit surface of a housing of the electron resonance source 220. Electrons in the gas/plasma resonate in a resonance path 242 around the magnetic field 251 and are heated. Said again, applying an electric field at a resonance frequency of the electrons results in absorbance of the field and heating. While FIG. 2 illustrates a single transformer or inductance change in the electromagnetic field path, two or more transformers are preferred, such as further described infra. In addition, thickness of the transformer material(s) 230 and importance thereof is further described infra.

Example II

Figure 3:
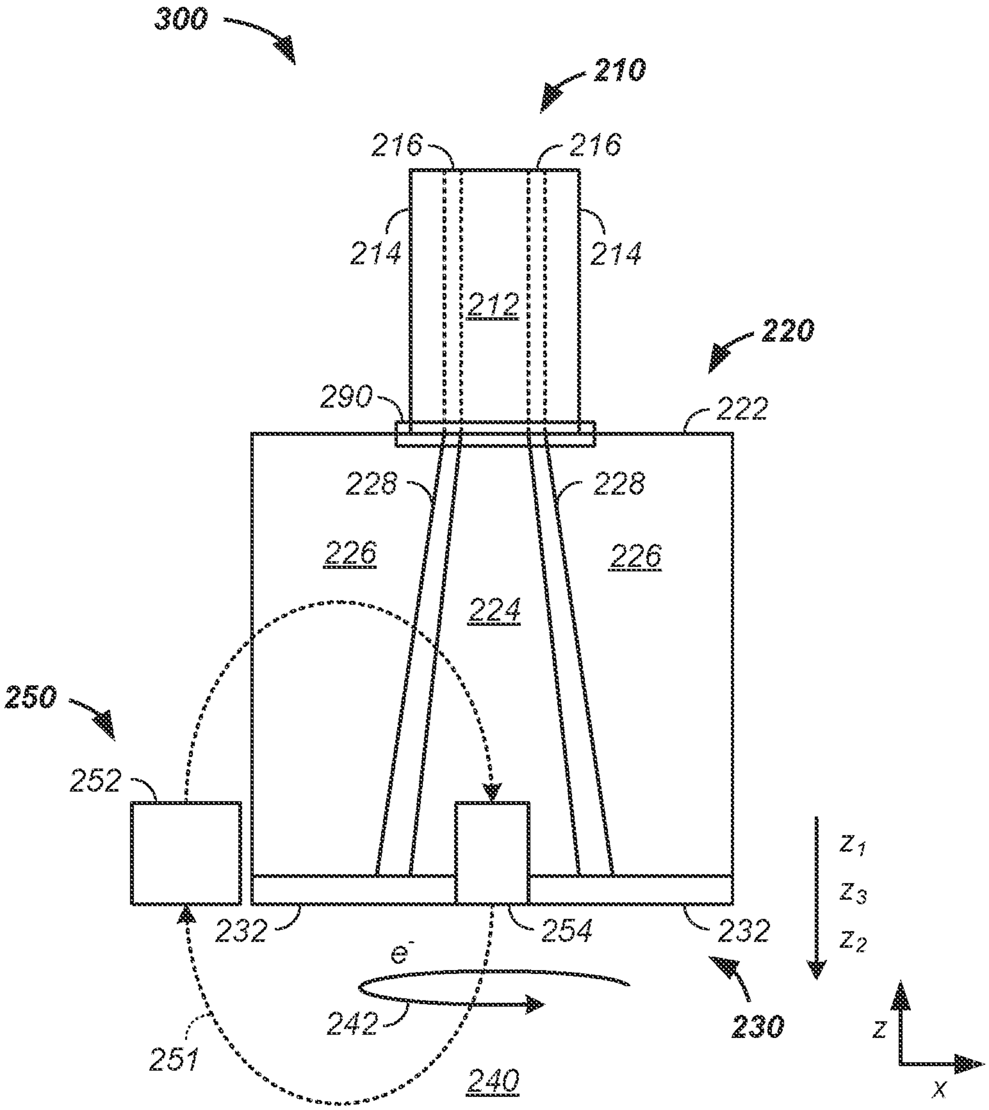
FIG. 3 illustrates a trapezoidal inner conductor.

Referring now to FIG. 3, a second example of coupling the electromagnetic wave to the gas/plasma 240 is provided, where common elements of the first example optionally remain the same. In the second example, a trapezoid equipped electron cyclotron resonance source 300 is described. As illustrated, in the second example, the ECR inner conductor 224 has a trapezoidal cross-section, such as along the z-axis and/or expands in cross-sectional area, along the z-axis in the x/y-plane, by at least 5, 10, 20, or 30 percent from an entry surface coupled to the co-axial cable inner conductor 212 to a surface attached to the first transformer section/material 232. Similarly, the ECR dielectric material 228 has a trapezoidal cross-section, such as along the z-axis in the x/y-plane and/or expands in cross-sectional area on the x/y-plane by at least 5, 10, 20, or 30 percent from an entry surface to an exit point of the electromagnetic wave traversing through the ECR dielectric material 228. An optional second magnet 254, used with or without the first magnet 252, is positioned at least in a central longitudinal z-axis axis of the electron cyclotron resonance source 220. The second magnet 254 functions to yield a the magnetic field 251 with a condition suitable for electron cyclotron resonance 242, such as in the gas/plasma 240. As illustrated, the ECR dielectric material 228 couples to the first transformer section/material 232. Hence, the electromagnetic wave passes from a region with a first impedance, $z_1$, such as while passing through the ECR dielectric material 228; then through a region with a second impedance, $z_2$, in the first transformer section/material 232; and then into the gas/plasma 240 with a third impedance, $z_3$. Optionally and preferably, the first transformer section/material 232 has a thickness of one-quarter wavelength, which aids transmittance of the electromagnetic wave as further described infra.

Figure 5B:
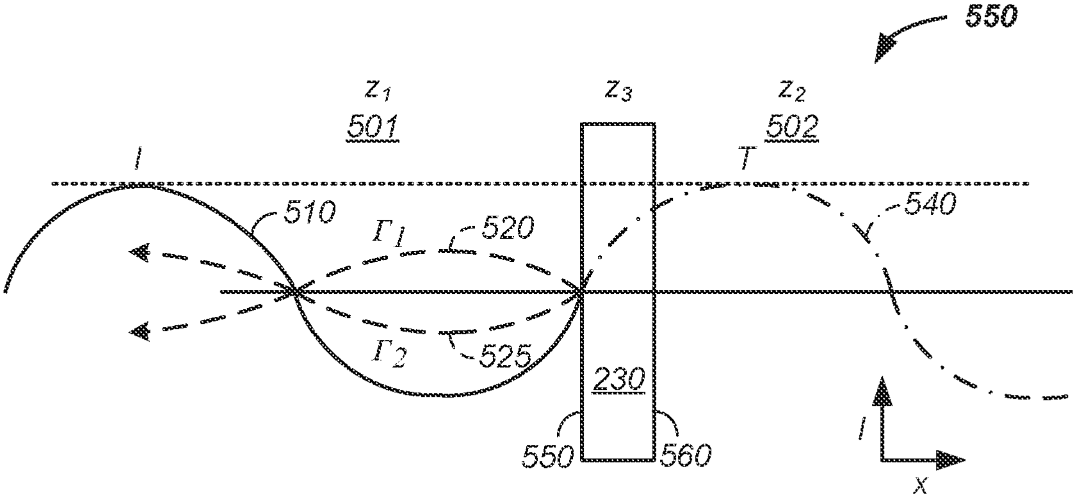
Figure 6A:
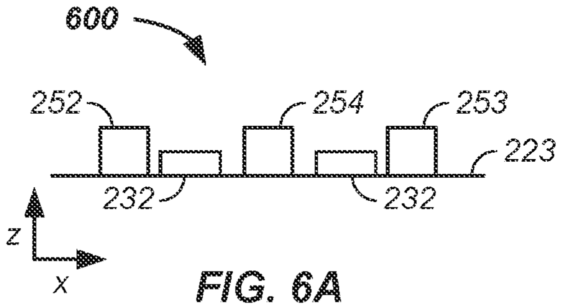
FIG. 6A, FIG. 6B, FIG. 6C, and FIG. 6D illustrate permutations and combinations of magnet positions.
Figure 6B:
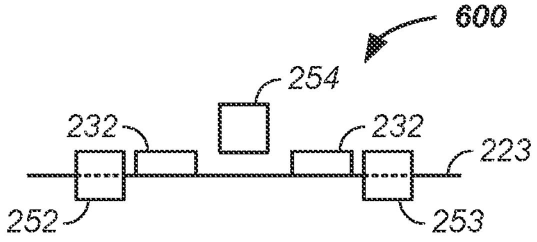
Figure 6C:
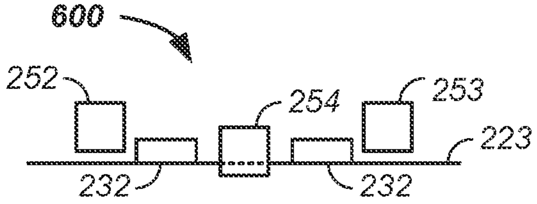
Figure 6D:
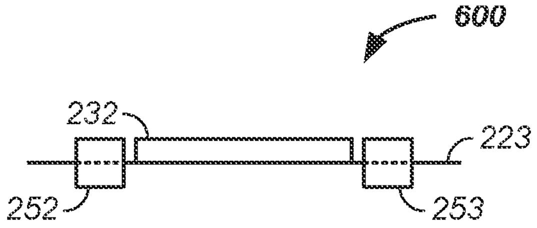

Referring now to FIG. 5B, a quarter-wavelength transformer 550 is described. As described supra in relation to FIG. 5A, an impedance change results in a partial wave reflectance and a resulting transmittance that is less than the initial intensity of the wave. A quarter-wavelength transformer reduces and/or eliminates the transmission loss as described herein. Referring again to FIG. 5B, the incident wave, I, has a first reflectance, $\Gamma'_1$, 520 off of an incident surface 550 of the transformer material 230. Similarly, the incident wave, I, has a second reflectance, $\Gamma'_2$, 520 off of an exit surface 560 of the transformer material 230. When the transformer material 230 is one-quarter wavelength thick, the total path of the electromagnetic wave in the transformer material 230 doubles to a half-wavelength. Thus, the second reflectance is 180 degrees out of phases with the first reflectance resulting in total destructive interference of the reflected wave and a total transmittance, T, that is equal in intensity to the incident wave, I. Thus, energy is not lost. In practice, the one-quarter wavelength thick transformer material 230 is optionally within 1, 2, 5, 10, or 15% of one-quarter wavelength thick.

Example III

Figure 4A:
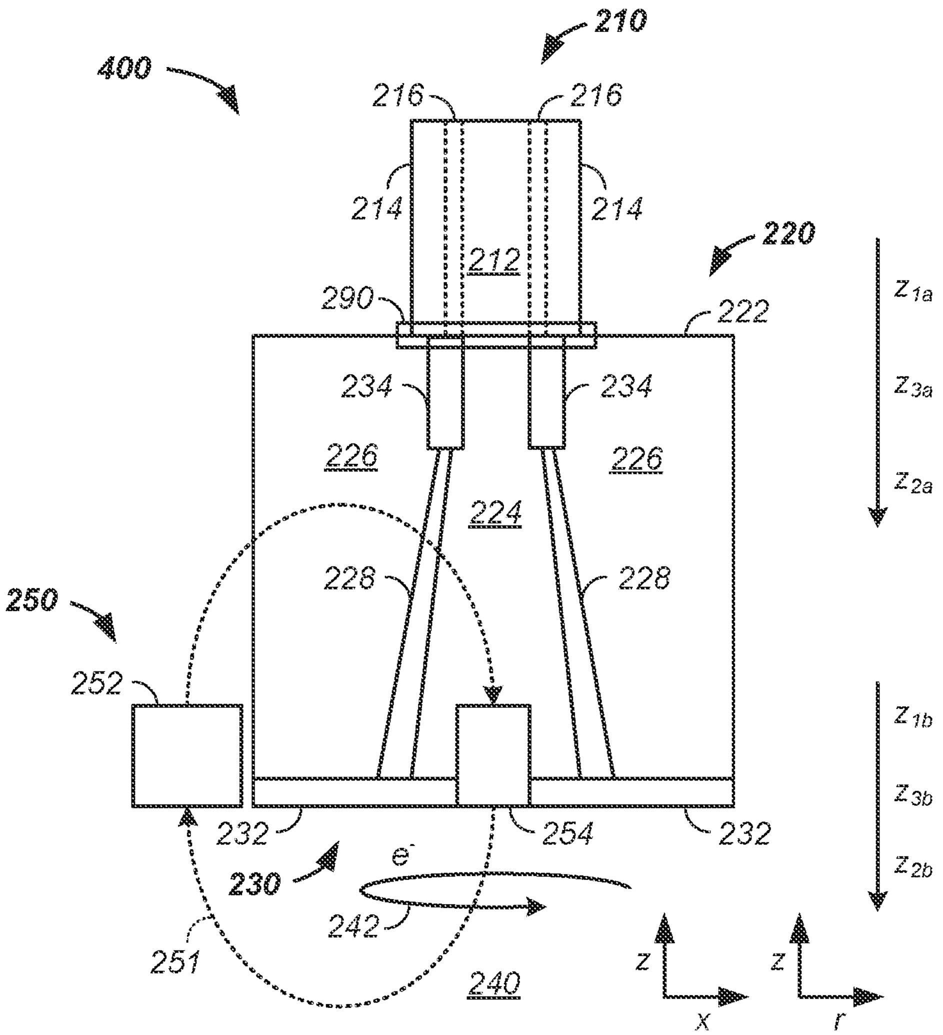
FIG. 4A illustrates two transformers and FIG. 4B illustrates impedance changes through the two transformers.
Figure 4B:
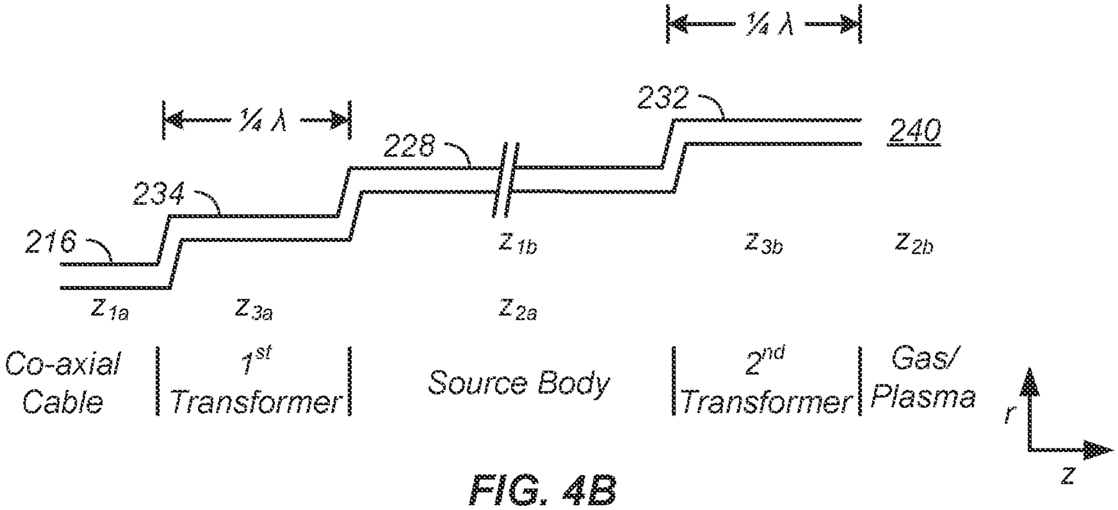

Referring now to FIG. 4A and FIG. 4B, a third example of coupling the electromagnetic wave to the gas/plasma 240 is provided, where common elements of the first example optionally remain the same. In this third example, an electron cyclotron resonance source 400 equipped with two impedance transformers is described. In this example, each of the two impedance transformers has its own transformer material 230, optionally and preferably with distinct/different impedances and/or distinct/different thicknesses.

Still referring to FIG. 4A and FIG. 4B, optically, in this example, the electromagnetic wave/radiation passes first through a second transform/transformer section/material 234 and subsequently through the first transformer section/material 232.

Still referring to FIG. 4A, the second transform section/material 234 couples the co-axial cable dielectric material 216 to the ECR dielectric material 228. Hence, in a first transform, the electromagnetic wave passes from an original first impedance, $z_{1a}$, related to the co-axial cable dielectric material 216 to an original second impedance, $z_{2a}$, related to the ECR dielectric material 228 via the second transform section/material 234 related to an original third impedance, $z_{3a}$, where the second transform section/material 234 optionally has a first quarter-wavelength thickness or within 1, 2, 4, 6, 10, or 15% thereof. Optionally and preferably, the second transform section/material 234 is polytetrafluoroethylene (PTFE) with a first transformer third impedance of 16.6Ω coupling a 50Ω impedance of the co-axial cable 210 with an original third impedance of 5.5Ω of a body of the electron cyclotron resonance source 220, such as in an x/y-plane cutting across the outer conductor 226, the ECR dielectric material 228, and the inner conductor 224, where the inner conductor 224 comprises at least 95, 98, 99, or 99.5 percent copper and the outer conductor 226 comprises at least 95, 98, 99, or 99.5 percent aluminum. Subsequently, in a second transform, the electromagnetic wave passes from the second impedance, $z_{2a}$, now denoted as a new first impedance, $z_{1b}$, still of the inner (copper) inductor 224, the ECR dielectric material 228, and the outer (aluminum) material 226, to a subsequent second impedance, $z_{2b}$, related to the gas/plasma 240 via the first transformer section/material 232 related to a subsequent third impedance, $z_{3b}$, where the first transformer section/material 232 has a second quarter-wavelength thickness or within 1, 2, 4, 6, 10, or 15% thereof. Optionally and preferably, the first transformer section/material 232 is at least 95, 98, 99, or 99.5% aluminum nitride (AlN) with a first transformer third impedance, $z_{3b}$, of 24.6Ω coupling the 5.5Ω impedance of the copper and aluminum body of the electron resonance source 220 still with the original impedance of 5.5Ω to the gas/plasma with an impedance of 110Ω. Thus, sequentially using two impedance transformers in the electron cyclotron resonance source 220 couples the 50Ω impedance of the co-axial cable 210 with the 110Ω impedance of the gas/plasma 240, effectively without loss of intensity of the electromagnetic wave or microwave power. Notably, the identified materials are selected as being: readily available, manufacturable at the scale/size needed, and with a combined combination of impedances that allow a two transformer electron cyclotron resonance source 220 to couple the microwave, of preferably 2.45 GHz±0.1 GHZ, to the gas/plasma 240. However, any 1, 2, 3 or more transformers are optionally used in the electron cyclotron resonance source 220 with the selection of any combination of materials having impedances changes that facilitate wave propagation and/or throughput.

Referring now to FIG. 4B, sequential movement of the electromagnetic wave, in this case a microwave: (1) from the co-axial cable dielectric material 216 of the co-axial cable 210; (2) through the second quarter-wavelength transformer section/material 234; (3) through the ECR dielectric material 228; (4) through the first quarter-wavelength transformer section/material 232; and (5) into the gas/plasma 240 is illustrated along with impedance changes as a function of z-axis position.

Figure 7:
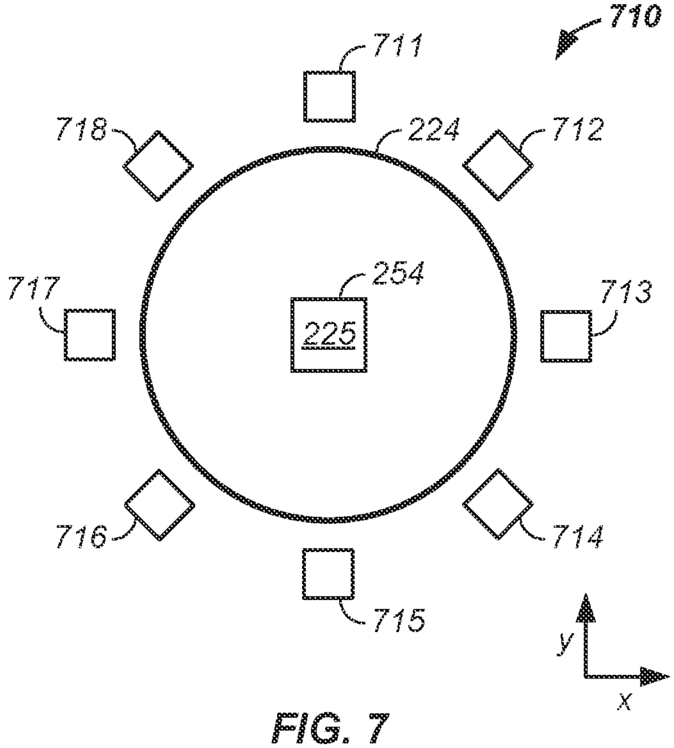
FIG. 7 illustrates a central magnet and ring magnet positions.

Referring now to FIGS. 6 and 7, optional positions of the set of magnets 250 are described. The goal is to achieve the magnetic field 251 in a position of the gas/plasma 240 resulting in a resonance path 242 of electrons around the magnetic field 251 at a strength suitable for electron cyclotron resonance. As the resonance path 242 is optionally of any distance away from an exit surface 223 of the electron cyclotron resonance source 220 in the plasma 240, any position of the magnet(s) in/by the electron cyclotron resonance source 220 that achieve this are optionally used. Several examples follow. Referring now to FIG. 6A, the first magnet(s) 252 and second magnet 254 are optionally flush with the exit surface 223 of the electron cyclotron resonance source 220. Referring now to FIG. 6B, the first magnet 252 protrudes past the exit surface 223 and/or is positioned adjacent to the electron cyclotron resonance source 220. Still referring to FIG. 6B, the second magnet is optionally positioned within the body of the electron cyclotron resonance source 220. Referring now to FIG. 6C, the first magnets 252 are optionally positioned along the z-axis prior to the exit surface 223 and/or the second magnet 254 protrudes past the exit surface 223. Referring now to FIG. 6D, the first transformer extends through a central longitudinal z-axis of the electron cyclotron resonance source 220. Any combination and/or permutation of the magnet positions described herein is optionally used. Referring now to FIG. 7, the set of magnets 250 optionally include any number of outer magnets 710 positioned, symmetrically or not, around a center point of the electron cyclotron resonance source 220, such as a first outer magnet 711, a second outer magnet 712, a third outer magnet 713, a fourth outer magnet 714, a fifth outer magnet 715, a sixth outer magnet 716, a seventh outer magnet 717, and an eighth outer magnet 718.

Plasma Zones

Figure 8:
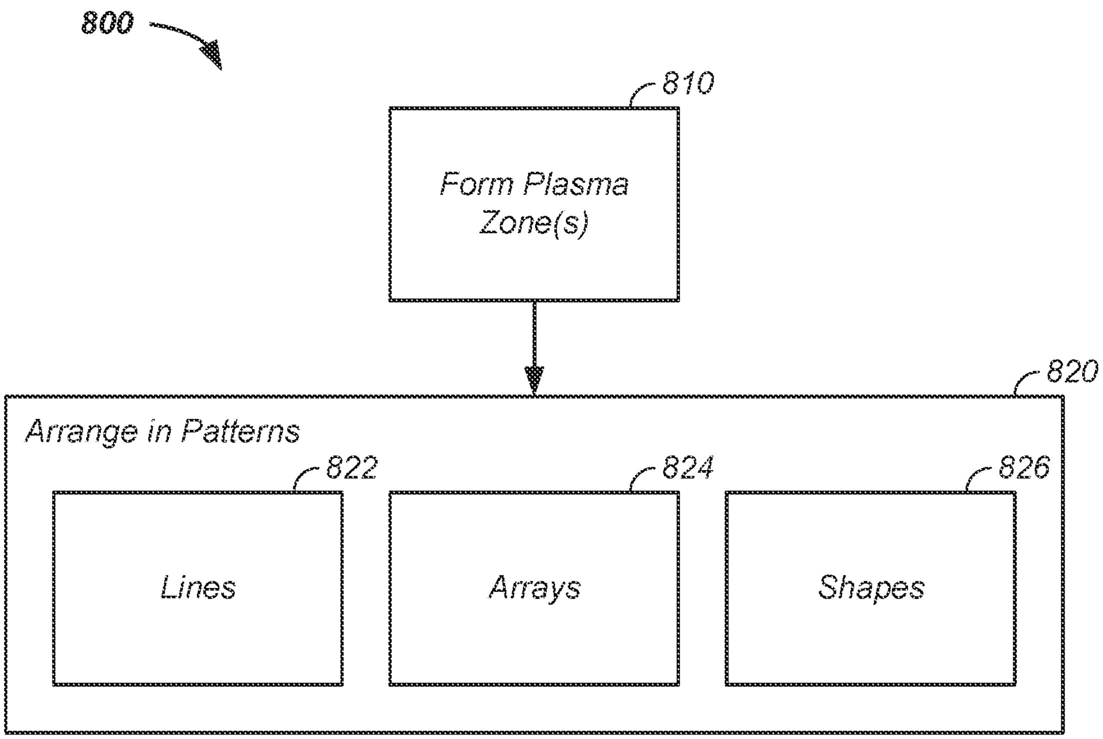
FIG. 8 illustrates a method of making shaped plasma.

Referring now to FIG. 8, applications 800 of the plasma generation system described supra, are described. Generally, the plasma generation system 200/the electron cyclotron resonance source 220 form a plasma in a zone/volume 810.

By altering positions of the magnets and/or optionally and preferably repeating application of the plasma generation system 200 in many locations, the plasma is optionally arranged in patterns 820, such as in lines 822, arrays 824, and/or patterns 826. Optional methods for forming plasma shapes are further described infra.

Figure 9:
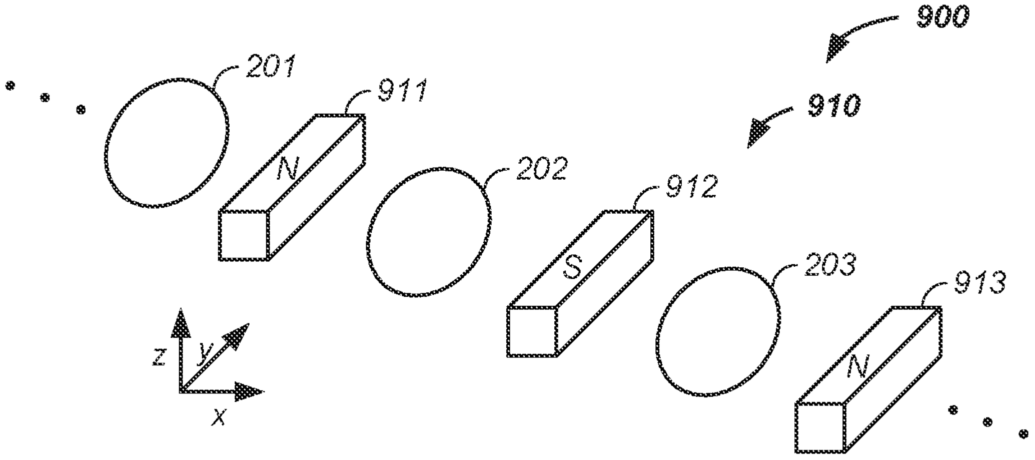
FIG. 9 illustrates generation of a first plasma line.

Referring now to FIG. 9, a first optional linear plasma pattern system 900 is described. As illustrated, a first plasma generation system 201 generates plasma at a first position, a second plasma generation system 202 generates plasma at a second position, and a third plasma generation system 203 generates plasma at a third position, where the linear pattern is repeated n times where n is a positive integer, such as greater than 2, 3, 5, 10, 100, or 1000. A set of magnets 910 is shared in this example, such as a first intermediately positioned magnet 911 and a second intermediately positioned magnet 912 positioned on opposite sides of the second plasma position 202 and/or the second intermediately positioned magnet 912 and a third intermediately positioned magnet 913 positioned on opposite sides of the third plasma position 203. Generally, any number n of intermediately positioned magnets are used in the linear array of plasma positions, such as greater than 2, 3, 5, 10, 100, or 1000 magnets. Optionally, the plasma positions expand and/or overlap to form a linear plasma shape.

Figure 10:
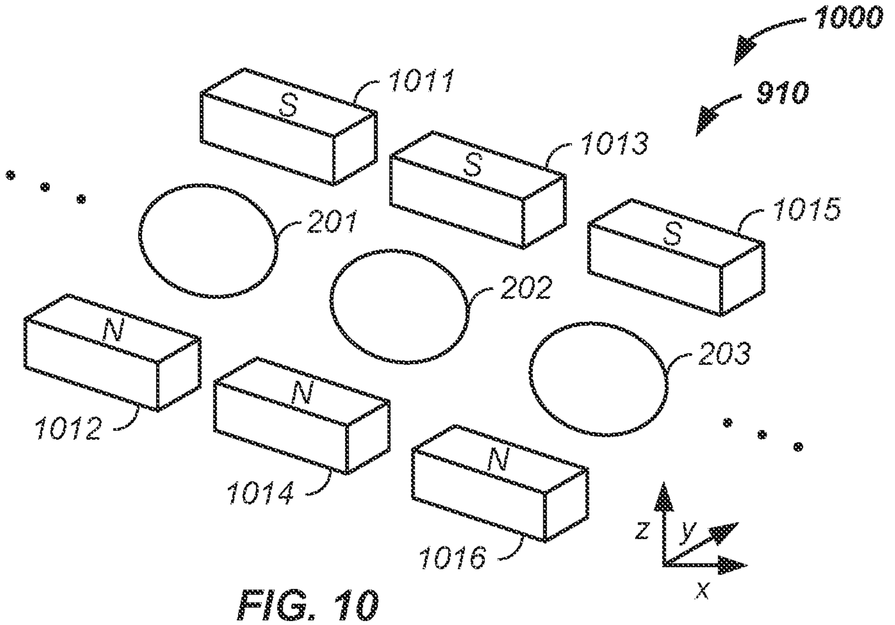
FIG. 10 illustrates generation of a second plasma line.

Referring now to FIG. 10, a second optional linear plasma pattern system 1000 is described. As illustrated, a first plasma generation system 201 generates plasma at a first position, a second plasma generation system 202 generates plasma at a second position, and a third plasma generation system 203 generates plasma at a third position, where the linear pattern is repeated n times where n is a positive integer, such as greater than 2, 3, 5, 10, 100, or 1000. Optionally, the plasma positions expand and/or overlap to form a linear plasma shape. A set of magnets 910 is also used in this example, such as a first outwardly positioned magnet 1011 and/or a second outwardly positioned magnet 1012 positioned on opposite sides of the first plasma position 201 and/or a third outwardly positioned magnet 1013 and a fourth outwardly positioned magnet 1014 on opposite sides of the second plasma position 202. Generally, any number n of outwardly positioned magnets are used in the linear array of plasma positions, such as greater than 2, 3, 5, 10, 100, or 1000 magnets.

Figure 11:
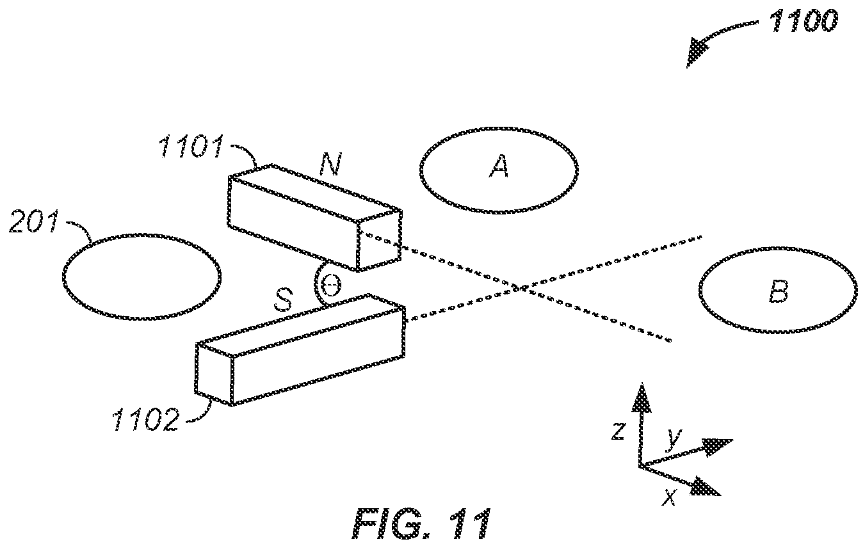
FIG. 11 illustrates magnets set at an angle yielding electron cyclotron resonance.

Referring now to FIG. 11, magnets set at an angle 1100 relative to a point, such as on a same plane as the magnets, as part of the plasma generation system 200/the electron cyclotron resonance source system 220 is described, forming a plasma at a first plasma position 201. Generally, any shape magnet is used. As illustrated, a first angled magnet 1101 and a second angled magnet 1101 are positioned with an angle, Θ, between the magnets. The magnets form a magnetic field 251 as described supra around which the electron cyclotron resonance 144 forms. The angle theta is optionally greater than 0, 1, 2, 5, 10, 25, or 50 degrees and is optionally less than 180, 178, 175, 170, 155, or 130 degrees. Additional magnets are optionally and preferably used to form plasma regions at any location forming any shape, such as illustrated by plasma zones A and B.

Figure 12:
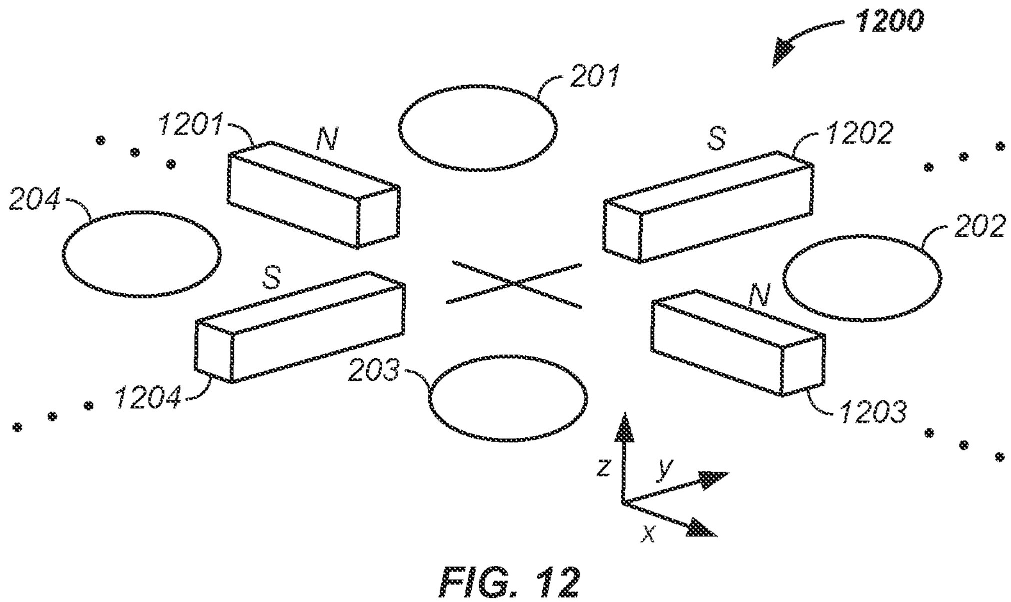
FIG. 12 illustrates generation of a plasma array and/or shape.

Referring now to FIG. 12, a plasma array 1200 is illustrated. Generally, an array of plasma positions is formed, such as a first plasma position 201, a second plasma position 202, a third plasma position 203, and a fourth plasma position 204, where the plasma positions optionally and preferably extend along the x- and/or y-axes with any spacing(s) with the use of a set of magnets, such as a first array magnet 1201, a second array magnet 1202, a third array magnet 1203, and a fourth array magnet 1204, where the array magnets extends to any number with any one or more spacings along the x- and/or y-axes.

Optionally, a coolant system is used to cool any of the elements described here. Optionally, the coolant system resides around the elements and/or at least partially passes through any of the elements described herein.

Generally, the plasma heating/generation system described herein applies to any plasma. Some examples provided for clarity of presentation and without loss of generality include: plasma assisted physical vapor deposition, plasma assisted chemical vapor deposition, plasma etching, surface treatment, biomedical applications, lighting, medicine, autoclaving, cleaning, oxidation/reduction of a substrate, plasma cutting, semiconductor manufacturing, environmental applications, aerospace propulsion, ion generation, and/or ozone generation.

Still yet another embodiment and/or example includes any combination and/or permutation of any of the elements described herein.

Herein, any number, such as 1, 2, 3, 4, 5, is optionally more than the number, less than the number, or within 1, 2, 5, 10, 20, or 50 percent of the number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for generating a plasma, comprising the steps of:

receiving a microwave from a co-axial cable, with a first impedance, into an electron cyclotron resonance source, said electron cyclotron resonance source comprising: a housing containing a first transform material and a transmission section;

passing the microwave through said first transform material with a second impedance;

coupling the microwave into said transmission section of said electron cyclotron resonance source, said transmission section comprising a third impedance, said transmission section comprising a first dielectric gap positioned between an inner conductor and an outer conductor;

generating a magnetic field with a set of magnets; and accelerating cyclotron resonant electrons circulating about said magnet field with the microwave.

2. The method of claim 1, said step of passing further comprising the step of:

transmitting the microwave through said first transform material, said first transform material comprising a one-quarter±one-tenth wavelength thickness.

3. The method of claim 2, further comprising the step of:

positioning a first magnet of said set of magnets in said housing.

4. The method of claim 1, further comprising the step of:

transmitting the microwave through a second transform material with a fourth impedance, said housing further containing said second transform material.

5. The method of claim 4, further comprising the steps of: said step of passing further comprising the step of moving the microwave through a one-quarter±one-tenth wavelength thickness of the microwave in said first transform material; and said step of transmitting further comprising the step of moving the microwave through a one-quarter±one-tenth wavelength thickness of the microwave of said second transform material.

6. The method of claim 4, further comprising the step of: sequentially performing said steps of: receiving, transmitting, coupling, passing, and accelerating.

7. The method of claim 6, further comprising the step of: transforming an impedance of said housing to couple an impedance zone of 50±30 Ohm in said co-axial cable to an impedance of 110±40 Ohm in the plasma through passing the microwave through said second impedance, said third impedance, and said fourth impedance.

8. The method of claim 1, said step of receiving further comprising the step of:

receiving the microwave with a frequency of 2.45 GHz±0.1 GHz.

9. The method of claim 8, further comprising the step of: transmitting the microwave through a second transform material comprising at least ninety percent polytetrafluoroethylene by mass.

10. The method of claim 9, said step of transmitting further comprising the step of:

passing the microwave through at least two impedance changes in said housing of said electron cyclotron resonance source.

11. The method of claim 9, further comprising the step of: transforming the microwave from an impedance zone of 50±25 Ohm in said co-axial cable to an impedance of 110±40 Ohm in the plasma through passing the microwave through said second impedance and said third impedance.

12. An apparatus for heating a plasma using a microwave, comprising:

a co-axial cable connector configured to receive the microwave, with a first impedance, into an electron cyclotron resonance source, said electron cyclotron resonance source comprising: a housing containing a first transform material and a transmission section;

a transmission path, in said housing, of the microwave passing through said first transform material, said first transform material comprising a second impedance;

said transmission section further comprising a first dielectric gap positioned between an inner conductor and an outer conductor, said transmission section configured as a coupling section between said co-axial cable connector and an exit surface of said housing in said transmission path, said transmission section comprising a third impedance, and a set of magnets, comprising at least one magnet, configured to generate a magnetic field past said exit surface into a plasma zone, wherein cyclotron resonant electrons circulating about said magnet field in the plasma are accelerated with the microwave.

13. The apparatus of claim 12, further comprising:

a second transform material in said transmission path, said transmission path sequentially passing: from said co-axial connector, through said second transform material, through said transmission section, through said first transform material, and through said exit surface.

14. The apparatus of claim 12, further comprising:

a second transform material in said transmission path, said second transform material comprising a fourth impedance, said first impedance at least twenty percent different from said fourth impedance.

15. The apparatus of claim 13, further comprising:

a first thickness of said first transform material within twenty-five percent of a one-quarter wavelength of the microwave in said first transform material; and a second transform material in said transmission path, said second transform material comprising a second thickness within twenty percent of a one-quarter wavelength of the microwave in said second transform material.

16. The apparatus of claim 13, said second transform material comprising:

at least ninety percent polytetrafluoroethylene by mass.

17. The apparatus of claim 16, said first transform material comprising:

at least ninety percent aluminum nitride.

18. The apparatus of claim 17, said inner conductor comprising at least ninety percent copper and said outer conductor comprising at least ninety percent aluminum.

19. The apparatus of claim 12, said inner conductor further comprising:

a trapezoidal cross-sectional shape with parallel sides of said trapezoidal cross-sectional shape crossing said transmission path.

20. The apparatus of claim 12, further comprising:

a plurality of said electron cyclotron resonance sources arranged in a plane.

* * * * *